April 10, 1945. J. A. DEUBEL 2,373,103
CONTROL SYSTEM
Filed May 1, 1940 2 Sheets-Sheet 1
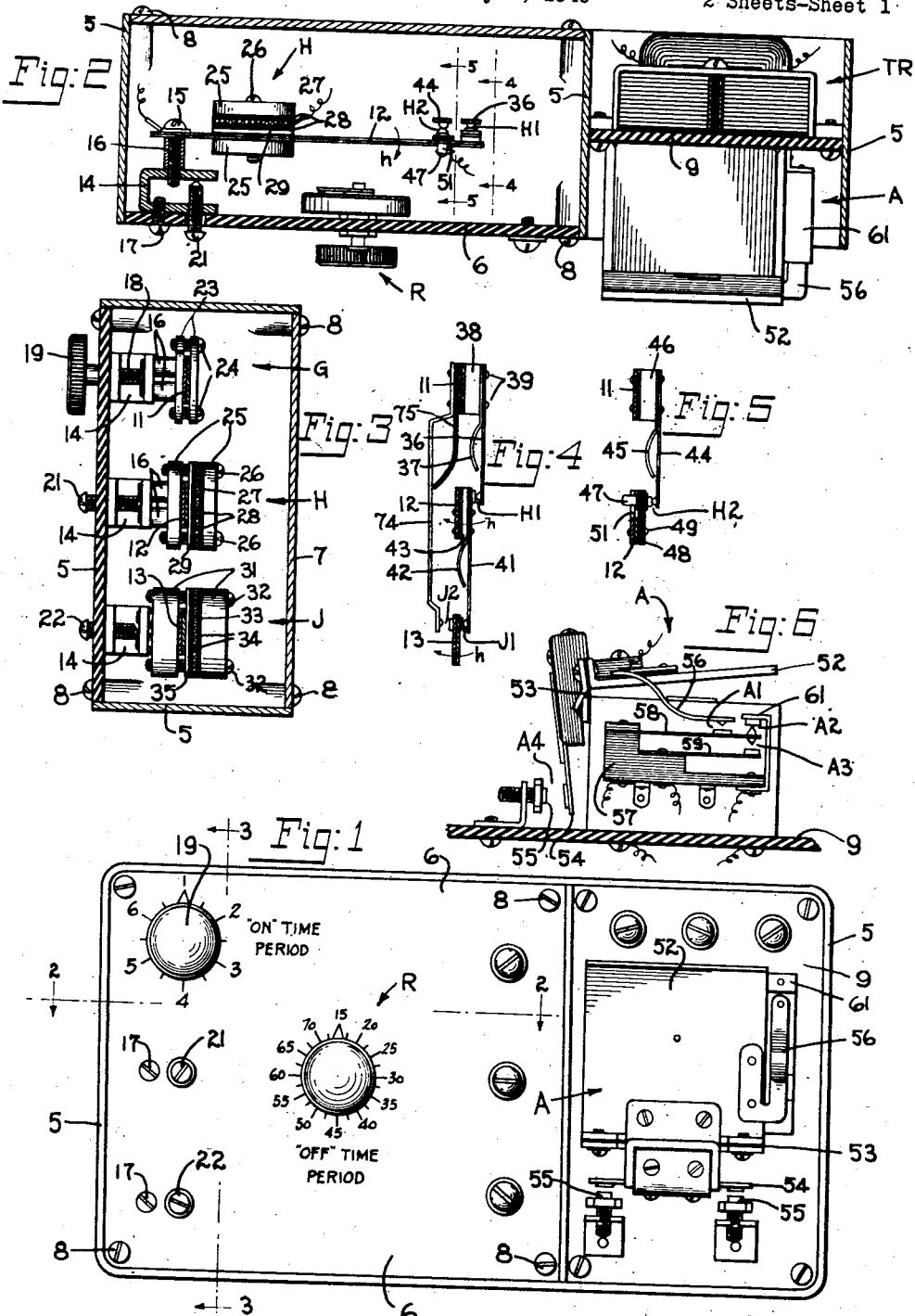
INVENTOR.
Justin A. Deubel
BY
M. Tate
ATTORNEY.

INVENTOR.
JUSTIN A. DEUBEL
BY
ATTORNEY.

Patented Apr. 10, 1945

2,373,103

UNITED STATES PATENT OFFICE 2,373,103

CONTROL SYSTEM

Justin A. Deubel, Milwaukee, Wis., assignor to Perfex Corporation, Milwaukee, Wis., a corporation of Wisconsin Application May 1, 1940, Serial No. 332,681

20 Claims. (Cl. 236—46)

This invention relates in general to control systems and more particularly to heating control systems employing an automatically operated mechanical stoker.

The simplest kind of heating system utilizing a mechanical stoker is that in which the driving mechanism, such as an electric motor, is operated by a thermostat which is situated to sense the temperature of the space to be controlled. In such a system the thermostat serves to cause operation of the stoker when the temperature of the space is below a certain predetermined temperature and to cause operation of the stoker to cease if the temperature of the space is above the desired predetermined temperature.

During severe weather when the heating system must operate a high percentage of the time, such a rudimentary system is satisfactory. However, certain difficulties are encountered if this basic system is used without auxiliary control means during mild weather when the stoker is called upon to operate a relatively small percentage of the time. Under the latter class of operation the stand-by or "off" periods of the stoker are so long in comparison to the operating or "on" periods that the fire burns itself out between successive "on" periods.

The customary method of alleviating this trouble is to provide an electrically operated motor and gear train timing mechanism which intermittently operates the stoker for regular "on" periods at regular "off" periods. In other words, the stoker is automatically operated for a short length of time, for example three minutes, whether heat is required or not, and then allowed to stand by if no heat is required in the system for an "off" period of predetermined length, for example sixty minutes, after which time another automatic "on" period is initiated. In this way fire is maintained in the stoker under all conditions and it is not necessary to frequently rekindle the fire in mild weather.

The primary object of this invention is to provide an improved heating system incorporating apparatus which is economical to manufacture, is simple in construction, and is reliable and accurate in operation.

A further object is to provide a control circuit arrangement for automatically controlling the operation of a heating plant in a more reliable and economical manner and without danger of the fire becoming extinguished.

A further object of this invention is to design a timing mechanism and stoker control in which the disadvantages of clock-work mechanism are eliminated.

A further object of the invention is to provide a new and improved timer for a stoker system which does not incorporate high speed and consequently quickly wearing parts or gear trains.

A further object is to provide a thermal operated timer which is reliable in operation and economical to build.

A further object is to provide a thermal operated timer whose timing functions are substantially free from variations due to ambient temperature fluctuations.

A further object of the invention is to provide new and improved means for operating a stoker in response to the control action of a space thermostat.

A further object is to provide a thermal operated timer which will operate a stoker for predetermined "on" periods at regular predetermined "off" periods.

A further object is to provide a thermal operated timer having adjustable means for regulating the duration of "on" and "off" periods in which the means are so related that the adjustment of one is ineffective on the adjustment of the other.

With the system outlined above, the stoker may be automatically operated by the timer just subsequent to an operation in response to a call for heat by the room thermostat in the space to be heated. If this condition exists the stoker will run for a length of time equal to the "on" period of the timer after the stoker has been running a relatively long time in response to the room thermostat. Such an automatic operation at such time is not required to prevent the fire from becoming extinguished, and therefore serves only to cause "over-shooting" of the temperature in the space being heated.

Certain devices have been incorporated in heating systems of the kind described to prevent such successive operations of the stoker. These devices are commonly referred to as "skip cycle" devices and in at least one form of device the timing mechanism is so arranged that after a stoker operation from the room thermostat a full timer "off" period must elapse before a timer "on" period may be initiated.

A further object of the invention is to provide a stoker control having means for interposing delay between operation of a stoker in response to room thermostat action and operation in response to an automatic timer operation.

Other objects and advantages reside in certain novel features of construction, arrangement, operation and combination of the parts and circuits which will be hereinafter more fully described in the specification, and particularly pointed out in the appended claims, and of which the preferred embodiments are illustrated in the accompanying drawings.

In the drawings:

Fig. 1 is a plan view showing a timing device of the invention;

Fig. 2 is a cross-sectional top view along the line 2—2 of Fig. 1;

Fig. 3 is a cross-sectional side view along the line 3—3 of Fig. 1;

Fig. 4 is an end view of the timing device taken along the line 4—4 of Fig. 2;

Fig. 5 is a similar view along the line 5—5 of Fig. 2;

Fig. 6 is a side view of a relay incorporated in the system showing the switching arrangement;

Figure 7:
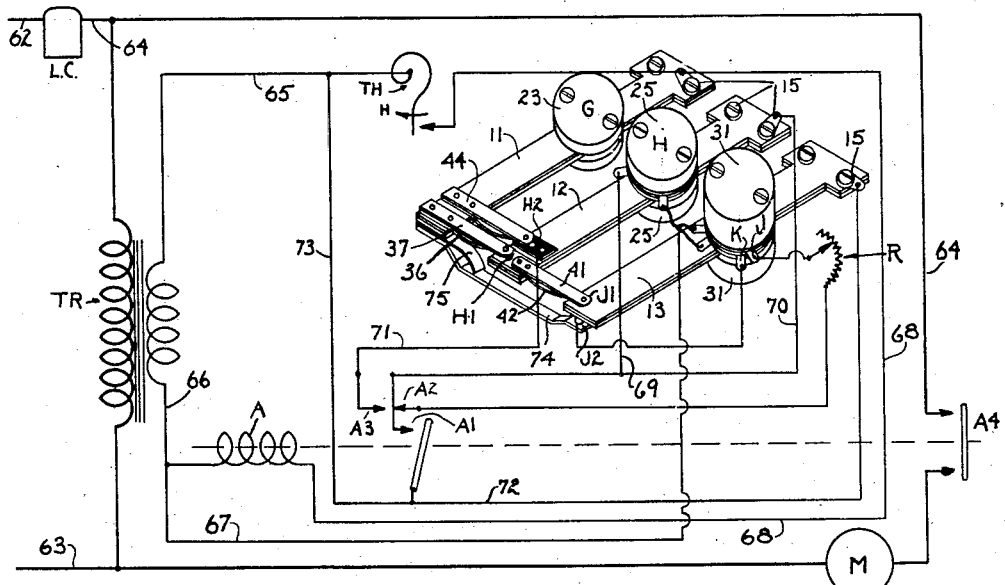
Fig. 7 is a wiring diagram and perspective view of a portion of the control mechanism.

While the invention is susceptible of various modifications and alternative constructions, the drawings shown and the description herein illustrate the preferred embodiments. It is to be understood, however, that there is no intention to limit the invention to the specific forms disclosed, but rather to cover all modifications and alternative constructions falling within the spirit and scope of the invention.

Generally stated, the invention contemplates the incorporation of a thermally operated timer in a stoker fired heating system so as to prevent extinguishment of the fire. In the exemplary form illustrated in the drawings a high and a low thermal inertia actuator are arranged to cooperate with each other and with a third thermal actuator. The high thermal inertia actuator serves principally to measure the "off" period timing by heating and cooling while the low thermal inertia actuator serves principally to measure the "on" period timing by heating. The third thermal actuator serves principally to compensate the other two for variations in ambient temperature.

Referring now particularly to the timer apparatus: means are provided for supporting the timing apparatus comprising a cast metal casing 5 formed in rectangular shape as illustrated and having an insulating panel 6 arranged on the front side thereof and an enclosing plate 7 on the rear side thereof. The panel 6 and plate 7 are attached to the casing 5 by means of the fastening screws 8 as shown. The casing 5 is divided by a partition into two sections and an insulating plate 9 is provided for the right hand section and is secured in place by screws as illustrated. A relay or electromagnet, generally designated as A, is mounted on the front of the insulating plate 9 by the screws shown in Fig. 6. A step down transformer, indicated at TR, is supported on the rear side of the plate 9. A variable resistor element indicated at R is centrally located on the back of the insulating panel 6. A shaft is arranged to extend from the resistor element to a knob on the front of the panel.

A plurality of control or thermal elements are positioned within the case and are generally designated as G, H and J. These control elements G, H and J preferably include flat strips or blades of bimetal 11, 12 and 13 respectively, each having relatively equal deflection characteristics when subjected to temperature variations. These strips of bimetal are formed with a wide supporting portion at one end (Fig. 7) and are each arranged to be mounted upon a separate U-shaped supporting bracket 14 by means of pairs of screws 15 which are threaded into one leg of the bracket 14. The screws 15 pass through sleeves 16 which space the bimetal elements from the supporting brackets 14. Brackets 14 are each rigidly secured to the rear side of insulating panel 6 by fastening screws 17. An adjusting screw 18 is threaded from the front of panel 6 through one leg of the bracket 14 which supports the bimetal 11, and the end of this screw 18 is arranged to bear against the opposite leg of the bracket 14. Screw 18 is provided with a knob 19 on the front of the panel. Rotation of the knob 19 serves to turn the screw 18 and thereby move the free leg of bracket 14 to alter or adjust the normal position of bimetal element 11. The bimetal blades 12 and 13 are provided with similarly positioned adjusting screws 21 and 22 respectively, having screw driver slots as shown to enable the associated brackets 14 to be adjusted from the front of the panel for the purpose of calibrating the bimetal blades 12 and 13.

The bimetal blades 11, 12 and 13 are arranged so that when they are subjected to a rise in temperature their free ends will move in a downward direction as seen in Fig. 2. Each of the bimetal blades is provided with means for increasing its thermal inertia such as a mass element. The mass elements are arranged so that they may be shifted endwise of the bimetal blades to effect the operating characteristics of the bimetal blades. The mass on the bimetal 11 comprises a pair of metal discs 23 clamped on each side of the bimetal by clamping screws 24. Bimetal 12 is provided with a similar pair of discs 25. These discs 25 are clamped to the bimetal 12 by screws 26. Suitable heating means is associated with the bimetal 12. Such means is shown as an electric heater 27, composed of a number of turns of resistance wire, clamped to the bimetal blade 12 by means of discs 25. The heater 27 is equipped with an insulating washer 28 on each of its sides, and a thin metal washer 29 on one side for purposes of insulation and rigidity respectively. The bimetal element 13 is provided with a pair of discs 31 of heavier mass than discs 25. These discs are clamped to the bimetal 13 as by screws 32. A suitable heater such as an electrical resistor wire 33 is clamped to the bimetal with discs 31 in the same manner as heater 27 as described above. Insulating washers 34 are arranged on each side of the heater and a thin metal disc 35 is arranged directly on top of bimetal element 13 for the reasons discussed in connection with heater 27.

Referring particularly to Figs. 4, 5 and 7 it will be seen that the bimetal element 11 is provided with a contact leaf spring 36 and a press back or stop member 37. Both spring 36 and stop member 37 are secured to the movable end of the bimetal in spaced relation by means of a spacer 38 and rivets 39. Bimetal blade 12 is provided with a contact leaf spring 41 and stop member 42, both of which are secured to the free end of bimetal blade 12 in spaced relation by means of a spacer 43 and rivets as shown. A second leaf spring 44, stop member 45 and spacer 46 are riveted as shown to the end of bimetal blade 11 and adjacent leaf spring 36. A contact stud 47 is suitably secured as shown in Fig. 5 to an insulating plate 48, which in turn is secured by rivet 49 to bimetal blade 12. Bimetal blade 12 is slotted as at 51 in order that contact stud 47 may be insulated from the bimetal element 12. The foregoing contact springs provide circuit opening and closing contacts as indicated at H1, H2 and J1.

Referring particularly to Figs. 1, 2 and 6 the relay structure A is of well known form having an armature 52 pivoted as at 53 for movement to and from the core. The armature carries a leaf spring 54 of the bridging type having a pair of contacts for bridging the adjustable stationary contacts 55 supported on the panel 9. The armature also carries a movable leaf spring 56 suitably insulated therefrom and movable with the armature. A contact spring support or block 57 made of insulating material is arranged on the side of the relay housing as shown. A pair of leaf springs 58 and 59 and a stationary member 61 are suitably secured to the block 57 as shown. The arrangement is such that as the armature 52 moves downward, leaf spring 56 closes a set of contacts designated as A1. Further downward movement of the armature 52 moves contact spring 58 downward away from member 61 opening contacts A2. Contacts A3 close on leaf spring 59 upon further downward movement of the armature 52. Upon restoration of the armature 52, contact points A3 first open, then contacts A2 close, after which contacts A1 open.

Figure 8:
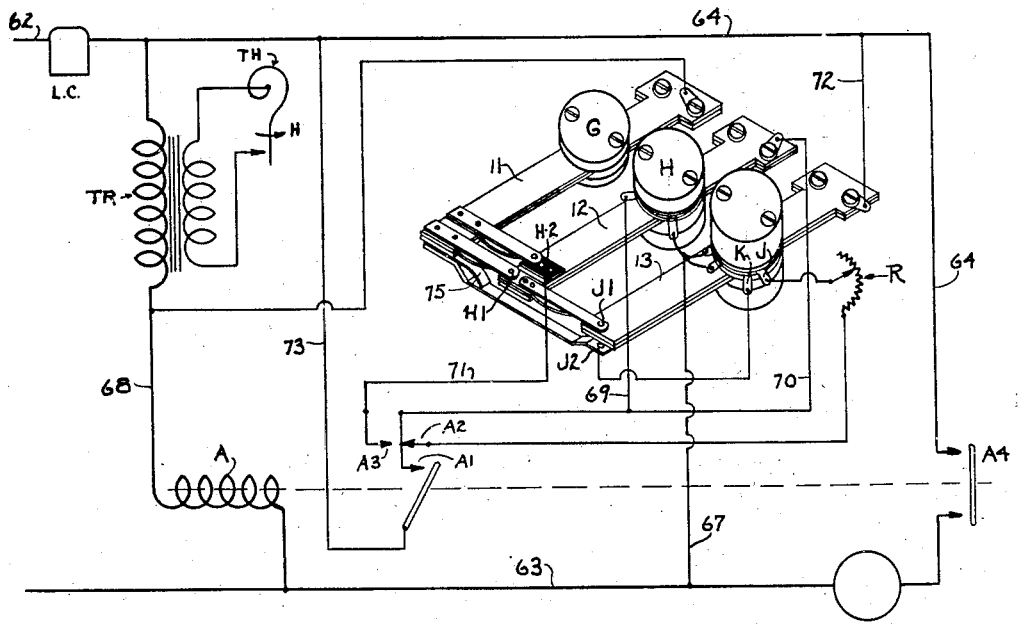
Fig. 8 shows a modified circuit.

Preferred circuit arrangements of the invention are shown in Figs. 7, 8 and 9. Referring particularly to the circuit shown in Figs. 7 and 8, power is brought into the circuit through conductors 62 and 63 connected to the electric service mains. Conductor 64 is connected to conductor 62 through the limit control LC. The primary of the transformer TR is connected to the conductors 64 and 63. One side of the secondary of the transformer TR is connected to one side of the thermostat TH by means of conductor 65. The other side of the secondary of the transformer TR is connected to one side of the relay coil A by means of conductor 66 and to one side of each of the heaters H and J by means of conductor 67. The other side of the thermostat TH and the other side of the relay coil are connected together by means of conductor 68. The other side of the heater J is connected through variable resistor R, contacts A2, and a conductor 69 to the other side of the heater H. One side of each of contacts A1, A3, H1 and J1 are connected together by means of conductor 70 and bimetal blade 12. Conductor 70 is additionally connected to conductor 69. The other side of contacts A3 is connected to one side of contacts H2 by means of conductor 71. The other sides of each of contacts H1 and H2 are connected together by means of bimetal 11 which is in turn connected to conductor 68. The other sides of each of contacts A1 and J1 are connected together by means of conductor 72 and bimetal 13 and are connected to conductor 65 by means of conductor 73. The stoker of the present system is shown herein merely by illustration of its actuating motor M. A circuit for the stoker motor M is arranged to extend from conductor 64 through contacts A4 and motor M to the power conductor 63.

*Operation*

As a preface to the description of the operation of the stoker control system of the present invention, the sequence of movement of the bimetal elements 11, 12 and 13 will first be described independently of most of the circuit connections whereby such movements are attained.

The bimetal elements 12 and 13 are heated in such a manner that they deflect downward, as shown in Figs. 2 and 7. After a considerable deflection of these two bimetal elements 12 and 13, the heaters H and J thereof are de-energized so that the two bimetal elements 12 and 13 start to cool and to deflect upwardly to their normal positions of Fig. 7. This cooling takes place during a portion of the "off" period of the stoker, and when the position of Fig. 7 is reached, an "on" period is initiated. This "on" period of the stoker is controlled jointly by the contacts J1, H1 and H2, the contacts H2 being opened to terminate the "on" period.

In order to initiate an "on" period, however, the contacts H1, H2 and J1 must all be closed. Contacts J1 and H1 may be said to constitute the starting contacts for initiating the "on" period while the contacts H2 serve as the stopping contacts for the "on" period.

As an incident to the initiation of an "on" period, the two heaters H and J are energized, but the energization of the heater J is only momentary since it is immediately opened by actuation of the relay switch A2. Since at this time only the heater H is energized, the bimetal element 12 deflects downwardly. Thus the bimetal element 12, after a predetermined time, opens the contacts H1 and later the contacts H2 so as to terminate the "on" period of the stoker and initiate the "off" period.

When the "on" period is terminated, release of the relay closes relay contacts A2 so that the heater J is energized. As a result the bimetal blade 12 continues to deflect and the bimetal blade 13 starts to deflect in a downward direction, with the element 12 advanced a considerable amount with respect to the bimetal element 13 due to the different mass of the two heaters H and J. Ultimately, however, the bimetal 13 will overtake the bimetal 12 and cause the opening of the contacts J1. The two heaters H and J are then de-energized and the bimetal elements 12 and 13 start to cool. Due to its relatively small mass, the bimetal 12 will cool more rapidly and will reach its normal position of Fig. 7 in advance of the bimetal 13. Thus the contacts H1 and H2 will be closed so as to be conditioned for termination of the "off" period and the initiation of an "on" period when the bimetal 13 reaches its normal position of Fig. 7 and closes the contact J1.

From the above it is to be understood that the control sequence is as follows: originally contacts H1, H2 and J1 are all closed and an "on" period is initiated. Heater H is energized and bimetal blade 12 heats. Contacts H1, and later contacts H2, open terminating the "on" period, initiating the "off" period, and causing energization of heater J. Bimetal blade 13 now heats and contacts J1 open causing de-energization of both heaters H and J and the consequent cooling of bimetal blades 12 and 13. Subsequently contacts H2, H1 and finally J1 close to initiate another cycle.

Referring particularly to Figs. 7 and 8, assume that the thermostat TH is open and the control has just been connected to the electric service mains. Under the above conditions the bimetal blades 11, 12 and 13 will all be at the same temperature and consequently all of the contacts associated with them, namely H1, H2 and J1 will be closed. A closed circuit for the heater H exists at this time extending from one side of the secondary through conductor 65, conductor 73, conductor 72, bimetal 13, contacts J1, bimetal 12, conductor 70, conductor 69, heater H, conductor 67, conductor 66 to the other side of the secondary. A closed circuit for the relay coil also exists extending from one side of the secondary through conductor 65, conductor 73, bimetal 13, contacts J1, contacts H1, bimetal 11, conductor 68, relay coil A, conductor 66 to the other side of the secondary. Assuming the limit control LC to be closed the transformer TR will be energized and consequently so also will be the relay A and heater H. When relay A pulls in contacts H1 are shunted by contacts H2 and A3. In response to the energization of the heater H bimetal 12 heats and slowly deflects downward. After some interval of time contacts H1 open and shortly thereafter contacts H2 open causing the relay A to drop out. Contacts H1, H2 and A3 are arranged to prevent the relay A from chattering when the circuit extending through contacts H1 and H2 is opened.

That the contact arrangement accomplishes the intended purpose may be explained as follows: When contact H1 opens, the circuit extending between bimetals 11 and 12 is not broken inasmuch as contacts H2 and A3 maintain the same. At the time that the bimetal 12 has deflected sufficiently to open the contacts H2, the contacts H1 have been separated sufficiently so that they are out of the zone where they may alternately make and break due to small variations in the deflection between the two bimetal elements. That is, they are so far apart that they will no longer "fry." When contacts H2 open they are, of course, just sufficiently made, or just sufficiently open, so that they might "fry," but inasmuch as contacts A3 open as soon as contacts H2 open, the circuit, which formerly extended through the contacts H2, is broken at the contacts A3 and it therefore becomes immaterial whether H2 alternately makes and breaks, or "frys" as it were.

While the relay A is closed, contacts A2 are open and the heater J is therefore not energized. As soon as the relay A falls out contacts A2 close and the heater J is energized in parallel with the heater H. Upon energization of the heater J the bimetal 13 slowly deflects downward in response to the increasing temperature of the heater and its associate mass 31. At this time both heaters H and J are energized and both bimetals 12 and 13 are deflected downward. Since the mass of blocks 25 associated with heater H are much less than the mass of blocks 31 associated with the heater J, the rate of heating of the bimetal 12 is somewhat greater than the rate of heating of the bimetal 13. In consequence of this, the bimetal 12 will deflect to its ultimate position in somewhat less time than is required for the bimetal 13 to similarly deflect. In effect bimetal 13 will lag behind bimetal 12. As a result of this difference in time-deflection characteristics of the two bimetal-blades the contact spring 41 will be deflected to a considerable extent shortly after heater H is energized. However, as bimetal 13 proceeds to heat and deflect in response to heater J the amount of deflection of the spring blade 41 will decrease. Finally after a considerable length of time bimetal 13 will have deflected to a position corresponding substantially to the ultimate position of bimetal 12. At this position contact blade 41 will engage the back stop 42 and will be prevented from further following the motion of the bimetal 13. When this occurs contacts J1 open and both heaters H and J are de-energized. Bimetals 12 and 13 begin to cool immediately and therefore deflect in an upward direction. Since the mass associated with bimetal 12 is much less than the mass associated with bimetal 13, bimetal 12 cools at a rapid rate while bimetal 13 cools at a slower rate and lags behind. The relative rate of cooling characteristics of the bimetals 12 and 13 are substantially the same as their relative rate of heating characteristics. Therefore the bimetal 12 will reach its ultimate cold position in relatively a short time. Shortly before this position is reached contacts H1 and H2 close but fail to establish any complete circuits because contacts J1 and A1 are open. It may be noted here that contacts J1 do not "fry" when they open because bimetal 12 deflects away from bimetal 13 with great rapidity.

At the time bimetal 12 reaches its ultimate cold position contacts J1 will be widely separated. As bimetal 13 cools the gap between the contacts J1 is steadily decreased and finally contacts J1 will again close. As soon as contacts J1 close a circuit is established for the relay A extending from one side of the transformer secondary through conductor 65, conductor 73, conductor 72, bimetal 13, contacts J1, contacts H1, bimetal 11, conductor 68, relay A, conductor 66 to the other side of the secondary. The relay A pulls in as a result of its energization and closes the contacts A1 in shunt around the contacts J1. The contacts A1, among other things, are provided to prevent the relay A from chattering, when contacts J1 close. As soon as contacts J1 make, the heater H is energized along with the relay A and another cycle of operation is initiated.

The length of time which expires from the time contacts J1 make until the time contacts H2 open is known as the "on" period time. This time is determined by the length of time required for the bimetal 12 to deflect sufficiently from its cold position to the position where the contact blade 44 engages the stop blade 45 and contacts H2 separate. This deflection is in turn determined by the relative positions of the bimetals 11 and 12 which determine the gap between the contact blade 44 and the stop 45 when the bimetal 12 is in its cold position. The amount bimetal blade 12 must deflect in order to open contacts H2 may be changed by shifting the positions of the bimetal blades 11 and 12 relative to each other by adjusting the knob 19.

The "off" period timing is herein defined as the length of time expiring between successive relay energizations. This time is measured by the time required for the bimetal 13 to heat sufficiently to open contacts J1 after contacts H2 open and then to cool sufficiently to again close contacts J1. By adjusting the rate of heat in-put into the mass elements 31 and the bimetal blade 13, the rate of deflection of the bimetal 13 may be varied and as a consequence the length of "off" period will be similarly varied. Adjusting the rheostat R adjusts the rate of in-put to the heater J for this purpose.

The thermostat TH operates independently from the timing device hereinbefore described and controls the relay A directly by circuit extending from one side of the secondary of the transformer TR through conductor 65, thermostat TH, conductor 68, relay coil A, conductor 66 to the other side of the secondary of the transformer. When the thermostat TH contacts close the relay A is energized under all conditions except when the limit control LC opens its contacts.

If the timer mechanism were designed to operate independently of the thermostat TH it would be possible to have an operating period from the timer mechanism directly after an operating period due to thermostat TH operation. This is undesirable as has been explained elsewhere, and in order to prevent the occurrence of this phenomenon contacts A2 are provided.

Whenever the relay A is energized the heater J is incapable of being energized since the circuit therethrough is broken by contacts A2. The heater H however, is energized under these conditions through relay contacts A1. Therefore, when the thermostat TH causes the relay A to be energized, bimetal blade 12 immediately begins to deflect toward its ultimate heated position regardless of the part of the cycle it is then in and upon reaching its ultimate position remains there so long as thermostat TH remains energized. As soon as the thermostat contacts TH open, the relay A will drop out, since contacts H1 and H2 will be open at that time in view of the fact that bimetal 12 is in its heated position. Contacts J1 however, will be closed and the heater H will continue to heat. When the relay A opens, contacts A2 close and cause energization of the heater J. Bimetal 13 then deflects a sufficient amount to open contacts J1 and thereby cause de-energization of heaters H and J. Bimetal blades 12 and 13 then cool and ultimately cause closure of contacts J1 and consequent energization of relay A in same manner as described above. In other words, after the circuit through relay A has been broken by the thermostat TH, the bimetal 13 must deflect to its hot position and then return to its cold position before the relay A may be again energized. It will be seen that under all conditions a delay will be interposed between thermostat operation and timer operation and that under ordinary conditions, that is, ordinary lengths of running time of the stoker from the thermostat TH, this delay will amount to a full "off" period timing.

If delay between stoker energizations provided by incorporating the contacts A2 is undesirable for any reason, the skip-cycle operation incidental to their use may be done away with by eliminating the contacts A2 and providing a conductor in their place. If this is done, the heaters H and J are always energized and de-energized together.

If the contacts A2 are dispensed with, the total cycle time, that is the "on" period time plus the "off" period time, will always be constant for a given "off" period setting regardless of the "on" period adjustment. Thus if the "on" period is lengthened the "off" period is shortened, etc. However, if the contacts A2 are used as shown, the "off" period is independent of any adjustment of the "on" period. Thus, if any change in "on" period is made, the total cycle time changes but the "off" period remains constant.

In either case adjustment of the "off" period does not change the length of the "on" period.

The length of time required for the bimetal 13 to deflect through a given range determines or measures the length of time of the "off" period. With a given heat in-put this length of time may be changed by altering the amount of mass associated with the bimetal blade 13, but under certain conditions it may be undesirable to associate too much mass with the bimetal 13 and yet it may be desirable to have relatively long "off" periods. If heat is supplied to the bimetal 13 and its associated mass in incremental rates rather than at one continuous rate, a substantially greater length of time may be made to expire to motivate the bimetal 13 through its required range. This is due to the fact that the temperature-time curves for any piece of material approach an asymptote as the material approaches its ultimate temperature with a given rate of heat in-put. If a control point is selected somewhere on the latter portion of the curve during that interval of time where the curve is approaching close to the asymptote, the control point will be indefinite in character because the rate of temperature change at such a point is relatively low. If, however, during the heating of the substance the rate of heat is applied for a certain length of time at one rate, and then for another length of time at a higher rate, the two heating curves may be added together to stretch out the total length of time and the control point may be selected at a point on the curve not nearly so close to the point of tangency with the asymptote.

In order to utilize this effect in the device at hand, an additional contact blade 74 (Fig. 4), together with a back stop 75 of insulating material may be suitably secured to the bimetal 11 as by rivets 39 in a manner so that blade 74 is electrically insulated from bi-metal 11. It is arranged to cooperate with bimetal 13 so that when bimetal 13 deflects in response to heat of the heater J it will deflect in response to one rate of heat input until it deflects sufficiently to engage contact blade 74 and cause engagement of contacts J2 and after such engagement it will deflect at a greater rate of heat in-put by energizing a heater K (Fig. 8). The heater K is associated within the mass elements 31 along with the heater J. This breaks up the heat curve for the bimetal 13 into two heating curves which might be said to be in series. While the energization of the second heater of itself shortens the time which would be required to open the contacts, this combination of two heating curves permits the timing to be actually increased by permitting a reduced heat input to the bimetal element without loss of accuracy in timing. Under these conditions, although the heating time is great, the control points occur at such positions that the timings measured by the bimetal element 13 are substantially constant. With the wiring arrangement shown in Fig. 7, the heater K must be designed so that the heat provided thereby is insufficient to maintain the element 13 in its hot position. Thus when heater J is deenergized due to opening of contacts J1, the bimetal element 13 will begin cooling even with heater K energized. This after a period of time causes contacts J2 to open at which time the heater K becomes deenergized for permitting continued cooling of element 13.

It will be noted that bimetal blades 11, 12 and 13 are arranged in parallel relationship in order that changes in ambient temperature will not disturb the relative relations of one of the blades to the others. That is to say, regardless of the ambient temperature surrounding the blades, the same temperature difference is required to deflect any one of the blades with respect to any of the others. Upon an ambient change all of the blades deflect up or down equally. The clamping blocks 23 on bimetal 11 are provided merely to render the same portion of bimetal 11 inactive as portions of bimetals 11 and 12 are rendered inactive by mass elements 25 and 31 respectively. In this way the same thickness of bimetal may be used for all three bimetal blades. If it is desirable, the blocks 28 might be dispensed with and the thickness of blade 11 made such as to compensate for their absence.

Fig. 8 shows substantially the same circuit arrangement as disclosed in Fig. 7 but differs in that the heating elements for the bimetal blades are shown operating at line voltage. The thermostat TH1 is a low voltage model operating through the transformer TR connected in this case as an impedance transfer device. Functionally the circuits of Figs. 8 and 9 operate in an identical manner.

Since only preferred embodiments of the invention have been disclosed, it is conceivable that modifications thereof may be readily perceived by those well versed in the art and it is therefore desired that the invention be not limited to the precise structure illustrated and described, but only to the extent of the appended claims.

What I claim is:

1. In a heating system of the class described, a mechanism for intermittently operating a heating device, first and second thermal responsive actuators each having hot and cold positions for affecting the operation of the system, each thermal responsive actuator being equipped with a heater for motivating the same, said first thermal responsive actuator being arranged to move slowly from its cold position to its hot position, in degrees varying with the elapsed time that its electric heater is energized, a burner for the system, means including first switching means on the first thermal responsive actuator for operating the burner, said first switching means arranged to be closed when said first thermal responsive actuator is in its cold position and to be opened prior to the time said first thermal responsive actuator reaches its hot position, means including second switching means for controlling the energization of said heaters and providing for concurrent energization of the same at least a portion of the time they are energized, said second switching means arranged to be closed when both thermal responsive actuators are in their respective cold positions and to be opened when said second thermal responsive actuator reaches its hot position.

2. In a heating system of the class described, a mechanism for intermittently operating a heating device for regular "on" period intervals at regular "off" period intervals, three thermal responsive electrically heated actuators, means responsive to the cooperative action of all of said actuators for initiating the "on" period, means responsive to the cooperative action of the first and second thermal responsive actuators alone for terminating the "on" period and initiating the "off" period, and means responsive to the cooperative action of the second and third thermal responsive actuators for effecting the termination of the "off" period.

3. A heating system comprising a solid fuel burning furnace, a motor for feeding fuel and air to the furnace, a circuit for the motor, a relay for controlling the motor circuit, a circut for the relay, a physical condition responsive means for controlling the relay circuit, first, second and third bimetal strips mounted at one end and arranged to have the free ends moved in the same direction on temperature rise, a heater for the second bimetal strip, a heater for the third bimetal strip, means for controlling said heaters and said relay comprising a first resilient contact operated by the free ends of the first and second bimetal strips, a second resilient contact operated by the free ends of the second and third bimetal strips, said contacts closed when all three bimetal strips are at ambient temperature, the first contact arranged to open in a relative short time and second contact in a relatively long time after the heaters are energized.

4. A heating system comprising a solid fuel burning furnace, a motor for feeding fuel and air to the furnace, a circuit for the motor, a relay for controlling the motor circuit, a circuit for the relay, a physical condition responsive means for controlling the relay circuit, a relatively fast acting and a relatively slow acting warp switch, means including contacts operated by the warp switches for periodically energizing the relay circuit independently of the physical condition responsive means, said means including contacts being constructed and arranged for energizing the relay and the heater of the fast acting warp switch when both warp switches are in their normal position and for de-energizing the relay and energizing the heater of the slow acting warp switch after the fast acting warp switch is heated, and for thereafter de-energizing both heaters after the slow acting warp switch is heated.

5. A heating system comprising a solid fuel burning furnace, a motor for feeding fuel and air to the furnace, a circuit for the motor, a relay for controlling the motor circuit, a circuit for the relay, a physical condition responsive device for controlling the relay circuit, means including a relatively fast acting and a relatively slow acting warp switch and contacts operated thereby for periodically energizing the relay circuit independently of the condition responsive device, said means being constructed and arranged for energizing the relay and the heater of the fast acting warp switch when both warp switches are in their normal position and for de-energizing the relay and energizing the heater of the slow acting warp switch after a relatively short period, and for de-energizing both heaters after a relatively long period, and ambient temperature compensating means for the warp switches.

6. In a timing control system for a stoker, the combination of, a first thermal responsive device, a second thermal responsive device, said thermal responsive devices being arranged for movement independently of each other, heating means for said devices, means for controlling the effect of said heating means on said devices for causing said devices to be intermittently heated and cooled, a control line adapted to start or stop the stoker, means actuated by one of said thermal responsive devices each time it reaches a predetermined temperature for controlling said control line in one manner, and means actuated by the other of said thermal responsive devices upon reaching a predetermined temperature for controlling said control line in the opposite manner.

7. In a timing control system for a stoker, the combination of, a first thermal responsive device, a second thermal responsive device, said thermal responsive devices being arranged for movement independently of each other, heating means for said thermal responsive devices, means controlled by one of said devices for controlling the application of heat to the other of said devices, means controlled by the other of said devices for controlling the application of heat to said one device, a control line adapted to start or stop the stoker, means actuated by one of said thermal responsive devices each time it reaches a predetermined temperature for controlling said control line in one manner, and means actuated by the other of said thermal responsive devices upon reaching a predetermined temperature for controlling said control line in the opposite manner.

8. In a timing control system, the combination of, a first thermal responsive device, a second thermal responsive device, a first heater primarily for the first thermal responsive device, a second heater primarily for the second thermal responsive device, switching means actuated upon cooling of said second thermal responsive device for energizing said first heater, and switching means actuated upon heating of said first thermal responsive device for energizing said second heater.

9. In a timing control system, the combination of, a first thermal responsive device, a second thermal responsive device, a first heater primarily for the first thermal responsive device, a second heater primarily for the second thermal responsive device, switching means actuated upon heating of said second thermal responsive device for deenergizing said first heater and switching means actuated upon heating of said first thermal responsive device for energizing said second heater.

10. In a timing control system, the combination of, a first timing means comprising a first thermal responsive device having a heater primarily therefor, a second timing means comprising a second thermal responsive device having a heater primarily therefor, said second timing means being arranged to heat and cool slower than said first timing means, and switching means controlled conjointly by said first and second timing means for controlling both of said heaters.

11. In a timing control system, the combination of, a first thermal responsive device, a second thermal responsive device, heating means for heating both of said devices, said second thermal responsive device being arranged to heat and cool slower than said first thermal responsive device, switching means controlled by said second thermal responsive device for controlling said heating means, said switching means being arranged to render the heating means inoperative when the second thermal responsive device becomes heated to cause both of said devices to begin cooling substantially simultaneously, said switching means also being arranged to render the heating means operative to heat at least one of said thermal responsive devices when the second thermal responsive device cools off, a control device, means for actuating said control device in one manner when the second thermal responsive device becomes cool and means for actuating said control device in the opposite manner when the first thermal responsive device becomes partially heated.

12. In a timing control system, the combination of, a relay, a timer comprising a thermal responsive device having a heater therefor, means including said thermal responsive device for controlling said heater in a manner to cause return movement of said thermal responsive device after forward movement thereof, thereby providing a timing cycle measured by a period of cooling and a period of heating of said thermal responsive device, means separate from the timer for energizing and deenergizing said relay, and means controlled by said timer and actuated after substantially a complete timing cycle beginning with deenergization of the relay by said separate means for energizing said relay.

13. In a timing control system, the combination of, a control device, a timer comprising a thermal responsive device having a first heater and a second heater, means including switching means controlled by said thermal responsive device for controlling said heaters so as to cause return movement of said thermal responsive device after forward movement thereof, thereby providing a timing cycle measured by a period of cooling and a period of heating of said thermal responsive device, means to change the effect of one of said heaters when the thermal responsive device reaches an intermediate temperature, in a manner tending to accelerate continued change in temperature thereof in the same direction, means for actuating said control device in one manner, and means controlled by said timer and actuated after substantially a complete timing cycle thereof for actuating said control device in the opposite manner.

14. In a timing control system, the combination of, a control device, a timer comprising a single thermal responsive device having a first heater and a second heater, means including switching means controlled by said thermal responsive device for controlling said heaters so as to cause return movement of said thermal responsive device after forward movement thereof, thereby providing a timing cycle measured by a period of cooling and a period of heating of said thermal responsive device, and means to change the effect of one of said heaters when the thermal responsive device reaches an intermediate temperature, in a manner tending to accelerate continued change in temperature thereof in the same direction.

15. In a timing control system, the combination of, a control device, a timer for actuating said device comprising a thermal responsive device and heating means therefor, a first switch for controlling said heating means, a second switch for controlling said heating means, said switches being actuated in sequence by said thermal responsive device and causing alternate periods of heating and cooling thereof whereby the thermal responsive device operates in a timing cycle consisting of a period of heating and a period of cooling, one of said switches being actuated when the thermal responsive device reaches an intermediate temperature and varying the heating effect of said heating means, in a manner tending to accelerate continued change in temperature of the thermal responsive device in the same direction.

16. In a timing control system, the combination of, a control device, a timer for actuating said device comprising a thermal responsive device and heating means therefor, a first switch for controlling said heating means, a second switch for controlling said heating means, said switches being actuated in sequence by said thermal responsive device and causing alternate periods of heating and cooling thereof whereby the thermal responsive device operates in a timing cycle consisting of a period of heating and a period of cooling, one of said switches being actuated when the thermal responsive device rises in temperature a predetermined amount and serving to increase the heating effect of said heating means.

17. In a control system, the combination of, a relay, a first thermal responsive device, a second thermal responsive device, a first heater for said first thermal responsive device, a second heater for said second thermal responsive device, means actuated upon cooling of said second thermal responsive device for energizing said relay and said first heater, means actuated upon heating of said first thermal responsive device for deenergizing said relay and energizing said second heater, and means actuated upon heating of said second thermal responsive device for deenergizing said second heater.

18. In a control system, the combination of, a relay, a physical condition responsive switching mechanism for energizing and deenergizing said relay, a first thermal responsive device, a second thermal responsive device, a first heater for said first thermal responsive device, a second heater for said second thermal responsive device, means actuated upon cooling of said second thermal responsive device for energizing said relay independently of said condition responsive switching mechanism and for also energizing said first heater, means actuated by said relay for preventing energization of said second heater, means actuated upon heating of said first thermal responsive device for deenergizing said relay and energizing said second heater, and means actuated upon heating of said second thermal responsive device for deenergizing said second heater.

19. In a stoker control system, the combination of, a stoker, means responsive to the demand for heat from the stoker for starting and stopping the same, a first thermal responsive device, a second thermal responsive device, a first heater for the first thermal responsive device, a second heater for the second thermal responsive device, means actuated upon cooling of said second thermal responsive device for energizing said stoker and said first heater, means actuated upon heating of said first thermal responsive device for stopping said stoker and energizing said second heater, means actuated upon heating of said second thermal responsive device for deenergizing said second heater, and means for preventing energization of said second heater when the stoker is in operation under the control of said heat demand responsive means.

20. In a stoker control system, the combination of, a stoker, a first thermal responsive device, a second thermal responsive device, heating means for said devices, means actuated in response to cooling of the second thermal responsive device to a predetermined temperature for placing the stoker in operation and causing heating of said first thermal responsive device, means actuated upon heating of said first thermal responsive device for placing said stoker out of operation, means for causing heating of the second thermal responsive device, and means actuated upon heating of said second thermal responsive device for causing the same to cool for again placing said stoker into operation.

JUSTIN A. DEUBEL.